(12) United States Patent  
Furtner

(10) Patent No.: US 9,536,086 B2  
(45) Date of Patent: Jan. 3, 2017

(54) CIRCUIT ARRANGEMENT, A METHOD FOR FORMING A CIRCUIT ARRANGEMENT, AND METHOD FOR INTEGRITY CHECKING

(75) Inventor: Wolfgang Furtner, Fuerstenfeldbruck (DE)

(73) Assignee: Infineon Technologies Austria AG, Villach (AT)

( * ) Notice: Subject to any disclaimer, the term of this patent is extended or adjusted under 35 U.S.C. 154(b) by 736 days.

(21) Appl. No.: 13/401,885

(22) Filed: Feb. 22, 2012

(65) Prior Publication Data

US 2013/0219187 A1  Aug. 22, 2013

(51) Int. Cl.
*G06F 11/30* (2006.01)
*G06F 21/55* (2013.01)
*G06F 21/79* (2013.01)

(52) U.S. Cl.
CPC .............. *G06F 21/558* (2013.01); *G06F 21/79* (2013.01); *Y10T 29/49004* (2015.01)

(58) Field of Classification Search
CPC .............. G06F 12/1441; G06F 12/0862; G06F 12/1475; G06F 9/3881; G06F 21/10; H04L 21/24

USPC  713/189, 187, 176, 175, 193, 323; 711/154, 711/147, 163
See application file for complete search history.

(56) References Cited

U.S. PATENT DOCUMENTS

| | | | |
|---|---|---|---|
| 6,480,101 B1 * | 11/2002 | Kelly | 340/10.2 |
| 6,928,523 B2 | 8/2005 | Yamada | |
| 2003/0233551 A1 * | 12/2003 | Kouznetsov | 713/175 |
| 2009/0196273 A1 * | 8/2009 | Kwon | 370/343 |
| 2012/0054498 A1 * | 3/2012 | Rickman | 713/183 |

FOREIGN PATENT DOCUMENTS

| | | |
|---|---|---|
| CN | 101142777 A | 3/2008 |
| CN | 101441588 A | 5/2009 |
| WO | 2006089160 A2 | 8/2006 |

\* cited by examiner

*Primary Examiner* — Thuong Nguyen
(74) *Attorney, Agent, or Firm* — Shumaker & Sieffert, P.A.

(57) ABSTRACT

A circuit arrangement is provided, the circuit arrangement including a processor; a memory circuit connected to the processor, wherein the processor is configured to access the memory circuit; a blocking circuit configured to generate one or more random wait state signals which prevent the processor from accessing the memory circuit; and an integrity checking circuit configured to check the memory circuit during a wait state period of the one or more random wait state signals.

27 Claims, 6 Drawing Sheets

CIRCUIT ARRANGEMENT, A METHOD FOR FORMING A CIRCUIT ARRANGEMENT, AND METHOD FOR INTEGRITY CHECKING

TECHNICAL FIELD

Various embodiments relate generally to a circuit arrangement, a method for forming a circuit arrangement, and method for integrity checking.

BACKGROUND

In Hardware Secure Modules (HSM) it is desirable to monitor the integrity of program code or data by an integrity checking circuit which is independent from the central processing unit (CPU) itself. The integrity checking circuit may be implemented in a less tamper prone way than the CPU system. For example the integrity checking circuit may be implemented as hardwired logic. When a change of the memory content is detected, the CPU may be halted, thereby increasing the tamper resistance of the overall system. Furthermore, hardware secure modules may be resistant against side channel attacks by inserting random wait-states into the CPU execution flow. For example, side channel attacks may be executed by monitoring the power supply during operations, e.g. during security related operations. Inserting random wait states into the CPU execution flow may disperse the power profile over time and may remove visible characteristics of security related operations. Random wait-state insertion may be used to prevent side-channel attacks. Both integrity checking and random wait-state insertion may slow down the program execution of the CPU.

SUMMARY

Various embodiments provide a circuit arrangement, including a processor; a memory circuit connected to the processor, wherein the processor is configured to access the memory circuit; a blocking circuit configured to generate one or more random wait state signals which prevent the processor from accessing the memory circuit; and an integrity checking circuit configured to check the memory circuit during a wait state period of the one or more random wait state signals.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "circuit" may be used herein to refer to an arrangement of one or more electrical components, configured, e.g. arranged, to perform a function, wherein the circuit may be implemented to perform the function by means of hard wired logic and/or by means of one or more programmable processors, e.g. by means of one or more programmable microprocessors, e.g. complex instruction set computer CISC microprocessors, e.g. reduced instruction set computer RISC microprocessors, e.g. digital signal microprocessors DSP.

Various embodiments provide a circuit arrangement which may improve efficiency of a processor during processes which secure the CPU. Various embodiments provide a circuit arrangement which may preserve CPU execution speed.

Figure 1:
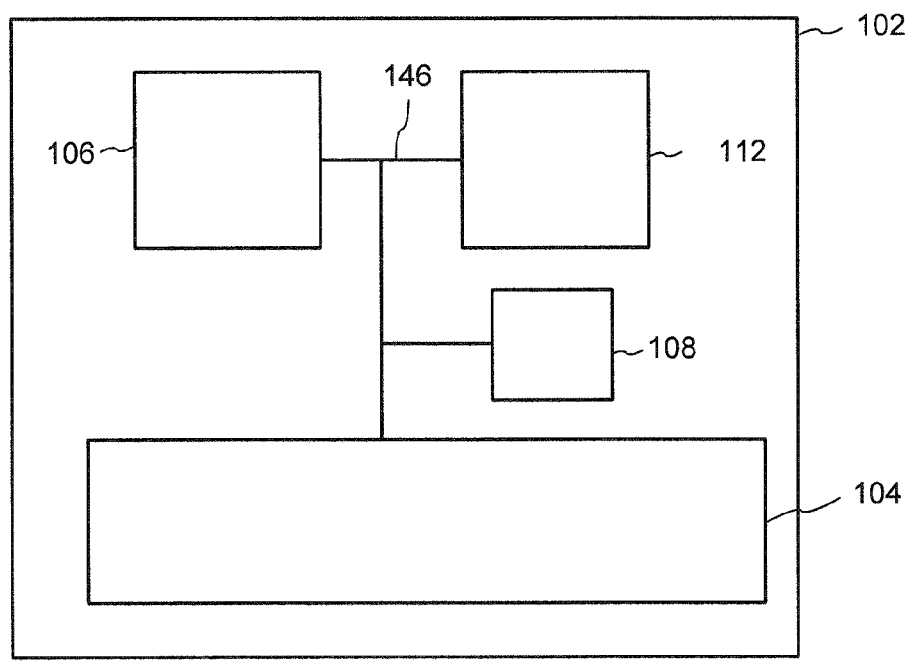
FIG. 1 shows a circuit arrangement according to an embodiment.

FIG. 1 shows circuit arrangement 102 according to an embodiment. Circuit arrangement 102 may include processor 104 and memory circuit 106 connected to processor 104. Processor 104 may be configured to access memory circuit 106. Circuit arrangement 102 may include blocking circuit 108 configured to generate one or more random wait state signals which prevent processor 104 from accessing memory circuit 106. Circuit arrangement 102 may include integrity checking circuit 112 configured to check memory circuit 106 during a wait state period of the one or more random wait state signals. The circuits or components, e.g. processor 104, blocking circuit 108, integrity checking circuit 112, memory circuit 106, may be electrically coupled via one or more electrical connections 146, e.g. one or more bus lines.

Figure 2A:
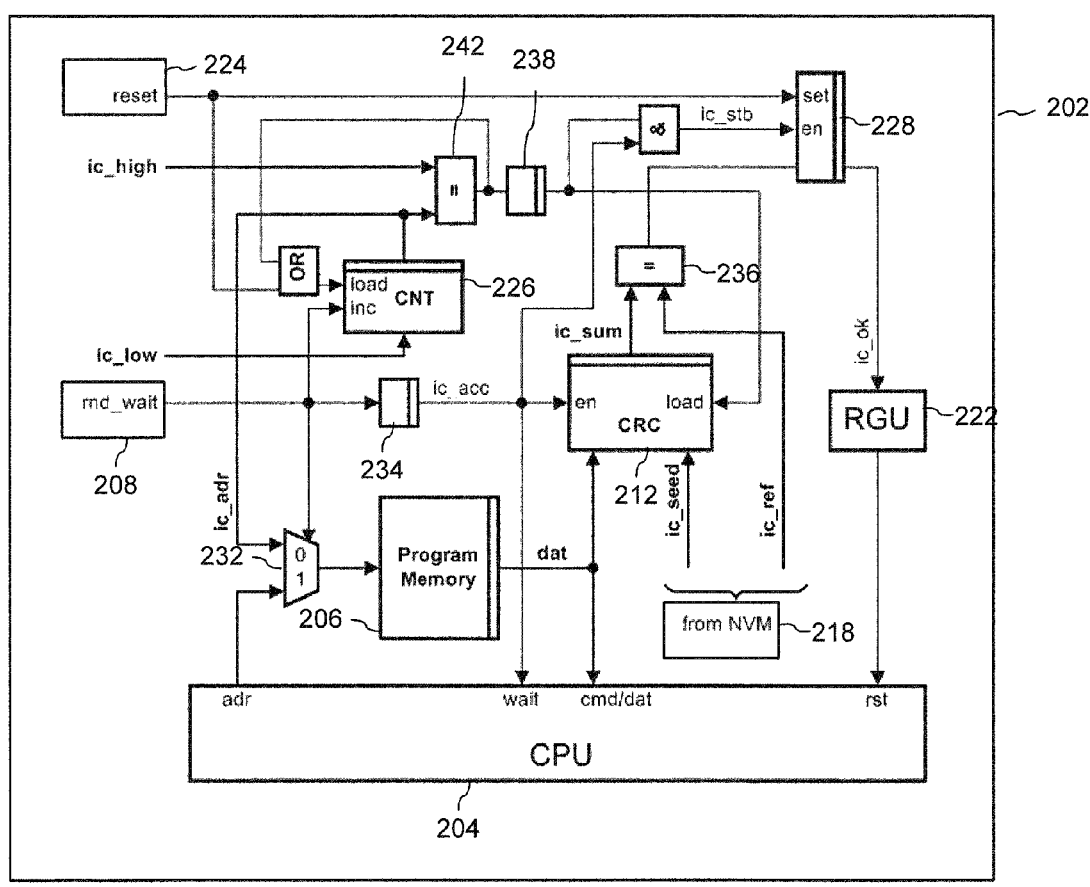
FIGS. 2A to 2C show a circuit arrangement according to an embodiment.
Figure 2B:
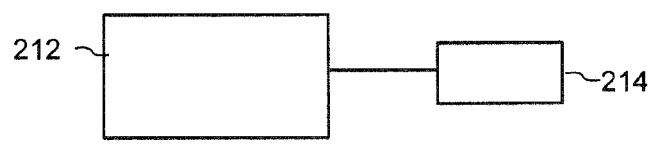
Figure 2C:
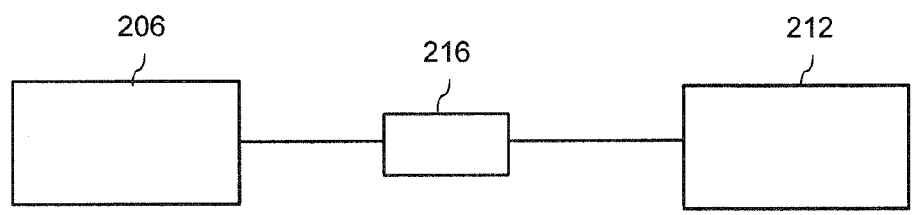
Figure 3:
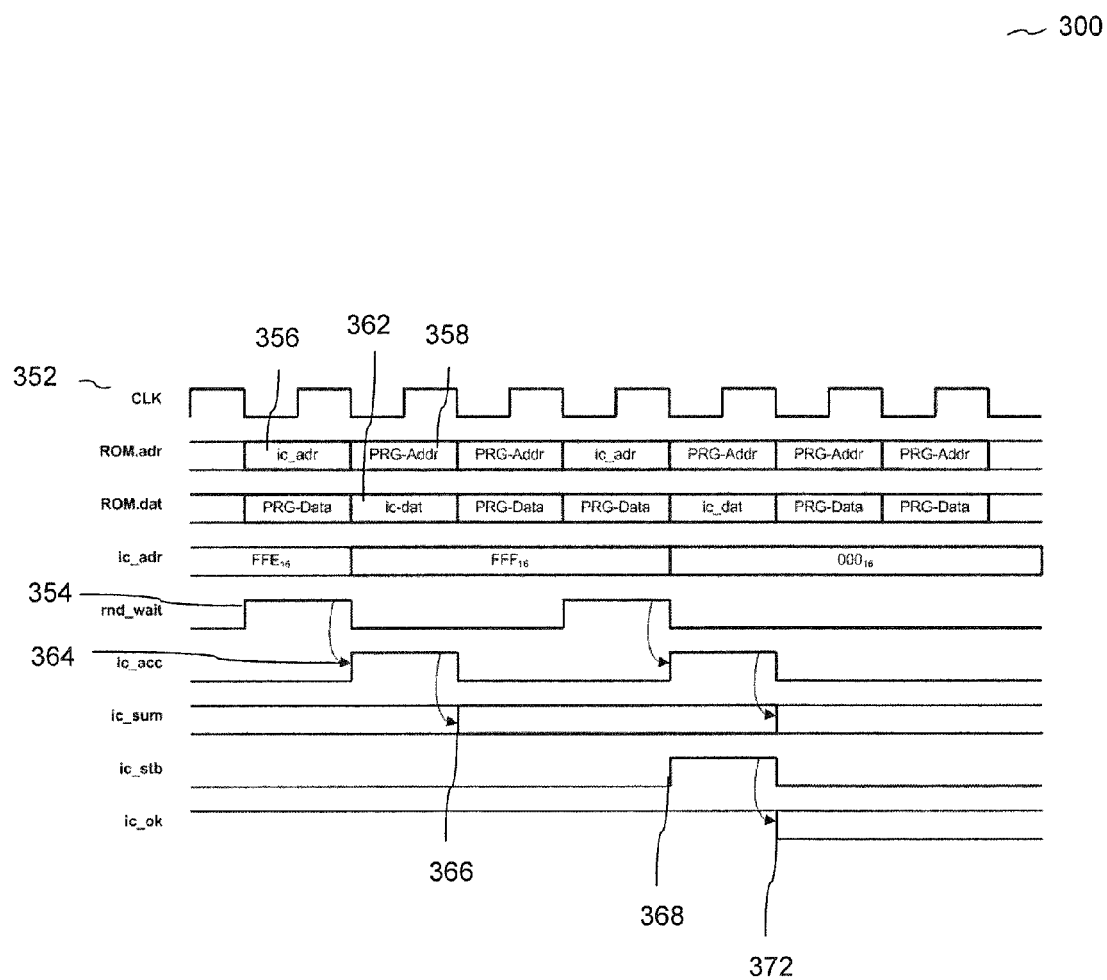
FIG. 3 shows a timing diagram according to an embodiment.

FIGS. 2A to 2C show circuit arrangement 202 according to an embodiment. FIG. 3 shows timing diagram 300 according to an embodiment. Timing diagram 300 may include a timing diagram of a circuit arrangement according to at least one of circuit arrangement 102 and circuit arrangement 202.

Circuit arrangement 202 may include processor 204 and memory circuit 206 connected to processor 204. Processor 204 may be configured to access memory circuit 206. Circuit arrangement 202 may include blocking circuit 208 configured to generate one or more random wait state signals which prevent processor 204 from accessing memory circuit 206. Circuit arrangement 202 may include integrity checking circuit 212 configured to check memory circuit 206 during a wait state period of the one or more random wait state signals.

Blocking circuit may be implemented by means of a random number generator, e.g. a true random number generator TRNG or a pseudo number generator PRNG. The true random number generator TRNG may be based on one or more oscillators, e.g. one or more ring oscillators.

The circuits or components, e.g. processor 204, blocking circuit 208, integrity checking circuit 212, memory circuit 206, may be electrically coupled via one or more electrical connections, e.g. one or more bus lines.

Processor 204 may include a central processing unit (CPU).

Processor 204 may be configured to access memory circuit 206 to execute one or more program instructions. Processor 204 may be configured to execute a sequence of operations. Processor 204 may be implemented by means of hard wired logic, e.g. wherein a fixed set of instructions may be executed. Processor 204 may be implemented as a programmable processor, e.g. as a microprocessor, e.g. as a complex instruction set computer CISC microprocessor, e.g. as a reduced instruction set computing RISC microprocessor.

Memory circuit 206 may include any non-volatile memory circuit, such as a read only memory ROM, a flash memory. Memory circuit 206 may include a non-volatile random access memory, e.g. a magnetoresistive random access memory MRAM, e.g. conductive bridge random access memory, CBRAM, e.g. a phase change element random access memory PRAM. Memory circuit 206 may include a non-volatile read only memory, e.g. a programmable read only memory PROM, e.g. an erasable programmable read only memory EPROM, e.g. an electrically erasable programmable read only memory EEPROM. Memory circuit 206 may include a volatile memory circuit e.g. a volatile RAM memory circuit, e.g. a static memory SRAM.

Processor 204, in the execution of one or more program instructions, may be configured to perform one or more algorithms. For example, processor 204 may include a cryptographic circuit, which may be implemented by means of hard wired logic and/or by means of one or more programmable processors. One or more programmable processors may include e.g. one or more programmable microprocessors, e.g. complex instruction set computer CISC microprocessors, e.g. reduced instruction set computer RISC, e.g. digital signal processors DSP.

For example, processor 204, may be configured to execute one or more program instructions, e.g. cryptographic code, and/or may be configured to perform one or more algorithms, e.g. cryptographic algorithm.

In other words, processor 204 may include a cryptographic circuit which may be configured to perform at least one cryptographic algorithm. As a result of the execution of one or more program instructions, such as the performance of one or more algorithms, processor 204 may generate a signal associated with the execution of the one or more program instructions, i.e. related to execution properties of the at least one cryptographic algorithm. Illustratively, the signal may be unintentionally generated. Illustratively, the signal may be, e.g. an execution pattern visible in the power consumption of integrity checking circuit 212, which may allow cryptographic credential data such as secure keys to be traced back.

If the associated signal is left un-masked, information, e.g. execution properties, related to the execution of one or more program instructions by processor 204 may be leaked, thereby weakening the security of processor 204 against unwanted side-channel attacks. Critically, if processor 204 may be configured to perform security operations, security information relating to processor 204 may be leaked, and side channel attacks may analyze at least one of the following leaked information, e.g. the duration of execution of the cryptographic algorithm, e.g. energy consumption, e.g. or electromagnetic radiation. The security operations which processor 204 may be configured to perform may include at least one cryptographic algorithm from the following group of cryptographic algorithms, the group consisting of: authentication algorithms, ciphering algorithms; and hash-function algorithms, e.g. MD5, SHA. Processor 204 may be configured to perform a block-ciphering algorithm. Processor 204 may be configured to perform at least one ciphering algorithm from the following group of ciphering algorithms, the group consisting of: secret key ciphering algorithm also called symmetric algorithms, e.g. AES, DES; and public key ciphering algorithm also called asymmetric, e.g. RSA, ECC. Processor 204 may be configured to perform a symmetric block-ciphering algorithm.

Blocking circuit 208 may be configured to generate one or more random wait state signals rnd_wait which alters the associated signal. The associated signal may include at least one type of from the following group of types of information, the group consisting of: timing information, e.g. information related to the length of time taken for processor 204 to execute certain instructions such as the duration of execution of the cryptographic algorithm; power and/or energy consumption information, e.g. information related to the amount of power used by processor 204 to execute certain instructions; electromagnetic radiation information. In other words, the insertion of one or more random wait state signals by blocking circuit 208 may mask the associated signal, e.g. by dispersing the power profile over time, e.g. by removing visible characteristics of security related operations.

Unwanted side-channel attacks which may weaken the security of processor 204 may be prevented by inserting random wait-state signals rnd_wait into the CPU execution flow. The insertion of one or more random wait state signals may slow CPU speed, i.e. the execution speed of processor 204, as the CPU, i.e. processor 204, may be prevented from accessing memory circuit 206. In other words, blocking circuit 208 may be configured to generate one or more randomly generated wait state signals rnd_wait during execution of instructions by processor 204, which halt the execution of instructions by processor 204.

During at least a part of the duration wherein processor 204 may be prevented from accessing memory circuit 206, in other words when the processor 204 may be prevented from accessing memory circuit 206 as a result of one or more random wait state signals, integrity checking circuit 212 may be configured to perform an integrity check on a predetermined set of memory data in memory circuit 206. In other words, blocking circuit 208 may be configured to generate one or more random wait state signals rnd_wait which triggers integrity checking circuit 212 to check memory circuit 206 during a wait state period wherein processor 204 is prevented from accessing memory circuit 206. Integrity checking circuit 212 may be configured to perform an integrity check on memory data in memory circuit 206 during a randomly generated wait state during which the execution of instructions by processor 204 is halted. Therefore, the random wait-cycles of the CPU system inserted for preventing side-channel attacks may be used to perform memory integrity checking without increasing required memory bandwidth.

Therefore, instead of carrying out wait state insertion processes and integrity checking processes independently from each other, integrity checking is combined with wait state insertion according to various embodiments. Therefore, the "inactive" time created by wait state insertion may be used by an integrity check circuit 212 separate from processor 204, to access memory circuit 206.

Integrity checking circuit 212 may be configured to receive one or more integrity checking instructions, which may include a set of memory data and a location of the memory data to be checked. For example, the integrity checking instructions may include an address ic_adr of the memory data to be checked, and the size of the set e.g. ic_low to ic_high of memory data to be checked.

One or more integrity checking instructions may be supplied to the integrity checking circuit 212 in response to blocking circuit 208 generating one or more random wait state signals rnd_wait, as shown in FIG. 2B.

Circuit arrangement 202 may further include a memory access controller, which may be implemented by means of hard wired logic and/or by means of one or a plurality of programmable processors. Circuit arrangement 202 may further include a memory access controller, e.g. direct memory access controller 216 configured to transfer memory data dat from memory circuit 206 to integrity checking circuit 212, as shown in FIG. 2C. Direct memory access controller 216 by means of one or more programmable processors, e.g. one or more programmable microprocessors, e.g. CISC microprocessors, e.g. RISC microprocessors.

Integrity checking circuit 212 may be configured to perform an algorithm to determine a state ic_sum of memory data in memory circuit 206. Integrity checking circuit 212 may be configured to perform at least one algorithm from the following group of algorithms, the group consisting of: ciphering algorithm; and hash-function algorithm, to determine the state ic_sum of memory data in memory circuit 206.

Integrity checking circuit 212 may be configured to perform a block-ciphering algorithm to determine the state ic_sum of memory data in memory circuit 206. Integrity checking circuit 212 may be configured to perform at least one ciphering algorithm from the following group of ciphering algorithms, the group consisting of: secret key ciphering algorithm; and public key ciphering algorithm, to determine the state ic_sum of memory data in memory circuit 206. Integrity checking circuit 212 may be configured to perform a symmetric block-ciphering algorithm to determine the state ic_sum of memory data in memory circuit 206. Integrity checking circuit 212 may be configured to perform a checksum algorithm, e.g. simple sum, CRC, non-linear function, HASH functions, to determine the state ic_sum of memory data in memory circuit 206.

Integrity checking circuit 212 may be configured to determine whether or not the state ic_sum of memory data in memory circuit 206 matches a reference state value ic_ref. Circuit arrangement 202 may include comparator circuit 236 configured to compare the state ic_sum of memory data in memory circuit 206 to a reference state value ic_ref.

The reference state value ic_ref may be saved in non-volatile memory circuit 218. Circuit arrangement 202 may include non-volatile memory circuit 218. Non-volatile memory circuit 218 may be configured to store at least one of the reference state value ic_ref and a seed value ic_seed, wherein the seed value ic_seed may be used for one or more checksum processes in the integrity checking circuit 212.

Integrity checking circuit 212 may be further configured to output a signal e.g. ic_ok asserted, indicating that the integrity of the memory data is maintained wherein the state ic_sum of the memory data in memory circuit 206 resulting from the integrity check matches the reference state value ic_ref; and to output a signal, e.g. ic_ok de-asserted, indicating that the integrity of the memory data is not maintained wherein the state ic_sum of the memory data in memory circuit 206 resulting from the integrity check does not match the reference state value ic_ref.

Processor 204 may be configured to access memory circuit 206, e.g. to continue to access memory circuit 206, e.g. to continue to execute program instructions, wherein the output signal indicates that the integrity of the memory data is maintained. Processor 204 may be configured to be prevented from access to the memory circuit 206 wherein the output signal indicates that the integrity of the memory data is not maintained. For example, circuit arrangement 202 may include controller circuit 222 configured to halt processor 204 when it is determined by integrity check circuit 206 that a state ic_sum of the memory data in memory circuit 206 does not match a reference state ic_ref, and to allow processor 204 to access continue to execute program instructions, when it is determined by integrity check circuit 206 that a state ic_sum of the memory data in memory circuit 206 matches a reference state ic_ref.

Circuit arrangement 202 may include a synchronous circuit arrangement, including a clock signal generator 352. Clock signal generator may include but is not necessarily limited to a 8 MHz or a 16 MHz frequency oscillator.

Reset circuit 224 may be configured to generate a reset signal rst which sets the address counter CNT 226 for the integrity checker address ic_adr to the start address ic_low. Moreover it asserts the integrity checker status output ic_ok. Reset circuit 224 may therefore be configured to be connected to assertion circuit 228 which asserts the integrity checker status output ic_ok. Reset circuit 224 may therefore be configured to be connected to address counter CNT 226 for the integrity checker address. Address counter CNT 226 for the integrity checker address may further be connected to read-only memory circuit 214 (not shown), wherein ic_adr may be sent from read-only memory circuit 214 to address counter CNT 226.

Blocking circuit 208 generates a signal rnd_wait 354, which delivers one or more random wait state signals, e.g. a sequence of random bits with the probability of a logical 1, which determines the percentage of wait-states inserted into processor 204 (CPU) execution. One or more random wait state signals may include at least one of a true random bit sequence or a pseudo random bit sequence.

Multiplexer circuit 232 may be configured between processor 204 and memory circuit 206. Multiplexer circuit 232 may be configured between processor 204 and address counter CNT 226. Multiplexer circuit 232 may be configured between memory circuit 206 and address counter CNT 226. Whenever rnd_wait is asserted, ic_adr 356 may be fetched from program memory, memory circuit 206, rather than the address 358 issued by processor 204 (CPU), using multiplexer circuit 232.

Integrity checking circuit 212 may be configured to be independent from the central processing unit (CPU), e.g. integrity checking circuit 212 may include a peripheral device of the CPU. Integrity checking circuit 212 may be implemented as hardwired logic configured to perform one or more integrity checking instructions. Alternatively, Integrity checking circuit 212 may be implemented as a programmable processor, e.g. as a microprocessor, e.g. as a complex instruction set computer CISC microprocessor, e.g. as a reduced instruction set computing RISC microprocessor, e.g. as a digital signal processor DSP, configured to execute one or more integrity checking instructions.

Integrity checking circuit 212 and blocking circuit 208 may each be connected to processor 204 by one or more input/output interfaces, which may include analog interfaces and/or as digital interfaces. The input/output interfaces may include serial interfaces and/or as parallel interfaces. Each of the input/output interfaces may be implemented in accordance with at least one from the following group of communication protocols, the group consisting of: an ad hoc communication protocol.

As shown in FIG. 3, in the cycle following rnd_wait=1, when the memory data dat at ic_adr is fetched, processor 204 may be halted by asserting the CPU.wait. Blocking circuit 208 may be connected to processor 204. Random wait signal, rnd_wait=1, may be delayed to ic_acc 364 by one or more flip-flop circuits 234, in order to obtain a look ahead to the bit sequence in order to compensate for the memory latency. In other words, random wait signal rnd_wait=1 may be multiplexed to memory circuit 206 and delayed by one or more flip-flop circuits 234. The delayed signal ic_acc delivered to integrity checking circuit 212 therefore may match the latency between the read address till data dat is applied to the read data output of memory circuit 206. Fetching of data dat and ic_adr from memory circuit 206 may be synchronized, and data dat may be accessed by integrity checking circuit 212 when integrity circuit 212 receives ic_acc.

The data dat may be accumulated in integrity checking circuit 212, e.g. a cyclic-redundancy check unit, to a checksum value ic_sum 366. Address counter CNT 224 may be used to accumulate the addresses from ic_low to ic_high. When the end address ic_high is reached, further comparator circuit 242 outputs a completion signal, and ic_stb 368 is asserted and the integrity checker status ic_ok 372 is renewed. The completion signal may be delayed by further delay circuit 238 before ic_stb 368 is asserted. Further comparator circuit 242 which may be connected to counter CNT 226, may be configured to check whether counter CNT 226 has reached address ic_high. Different seed values ic_seed may be pre-loaded into integrity checking circuit 212, e.g. the checksum register, to alter the accumulation sequence between devices or for subsequent checking cycles of the integrity checker.

Comparator circuit 236 may be connected to integrity check circuit 212, and may compare the accumulated checksum ic_sum to the reference value ic_ref. Comparator circuit 236 generates an output signal including information relating to the comparison if ic_sum to the reference value ic_ref, to assertion circuit 228. Assertion circuit 228 may be connected to integrity check circuit 212. Assertion circuit 228 may be connected to integrity check circuit 212 through comparator circuit 236. When the accumulated checksum ic_sum matches the reference value ic_ref, assertion circuit 228 asserts ic_ok, and ic_ok remains asserted. When the accumulated checksum ic_sum does not match the reference value ic_ref, assertion circuit 228 de-asserts ic_ok, and ic_ok is de-asserted. A de-asserted ic_ok may be transmitted from assertion circuit 228 to controller circuit 222. Assertion circuit 228 may be connected to controller circuit 222. A de-asserted ic_ok may result in at least one of the following processes. For example, processor 204 may be halted via controller circuit 222, i.e. the reset generation unit RGU. Alternatively or additionally, processor 204 may be halted by asserting processor reset/wait. Alternatively or additionally, the processor clock may be stopped. Alternatively or additionally, power may be removed from processor 204.

Figure 4:
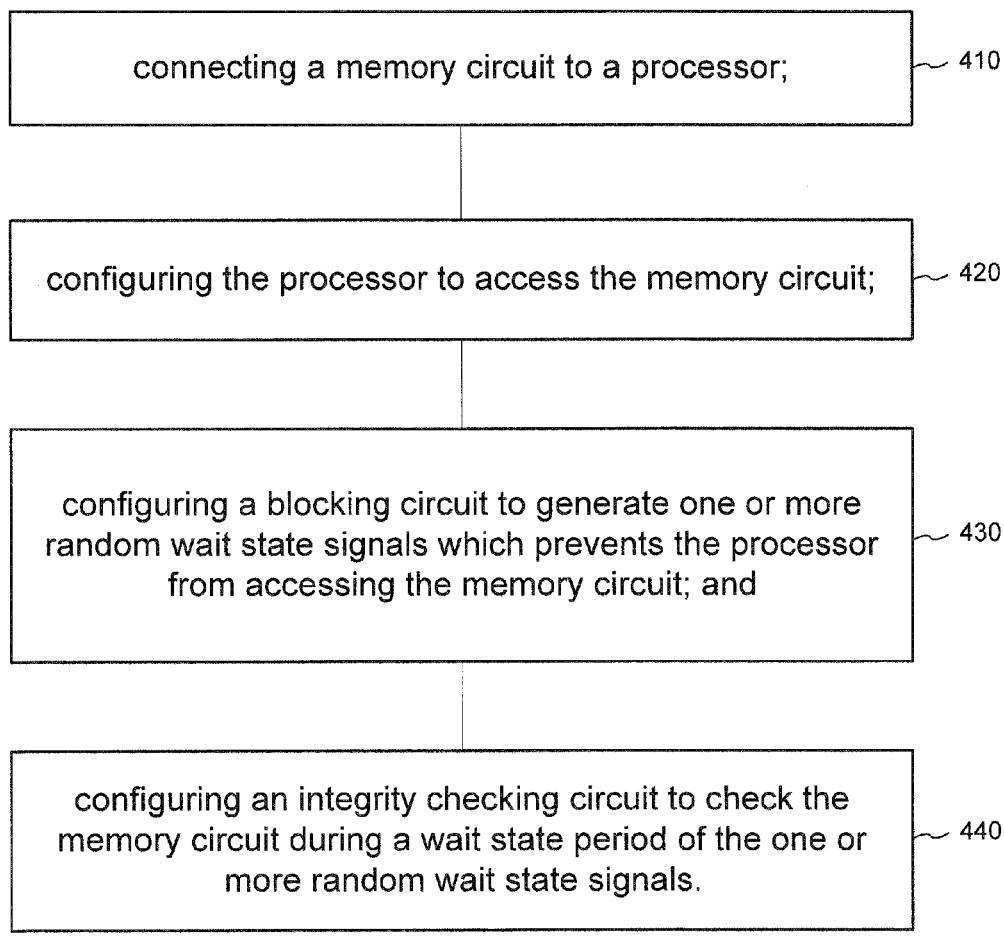
FIG. 4 shows a method for forming a circuit arrangement according to an embodiment.

FIG. 4 shows method 400 for forming circuit arrangement 102 according to an embodiment. Method 400 includes:
connecting a memory circuit to a processor (in 410);
configuring the processor to access the memory circuit (in 420);
configuring a blocking circuit to generate one or more random wait state signals which prevent the processor from accessing the memory circuit (in 430); and
configuring an integrity checking circuit to check the memory circuit during a wait state period of the one or more random wait state signals (in 440).

Figure 5:
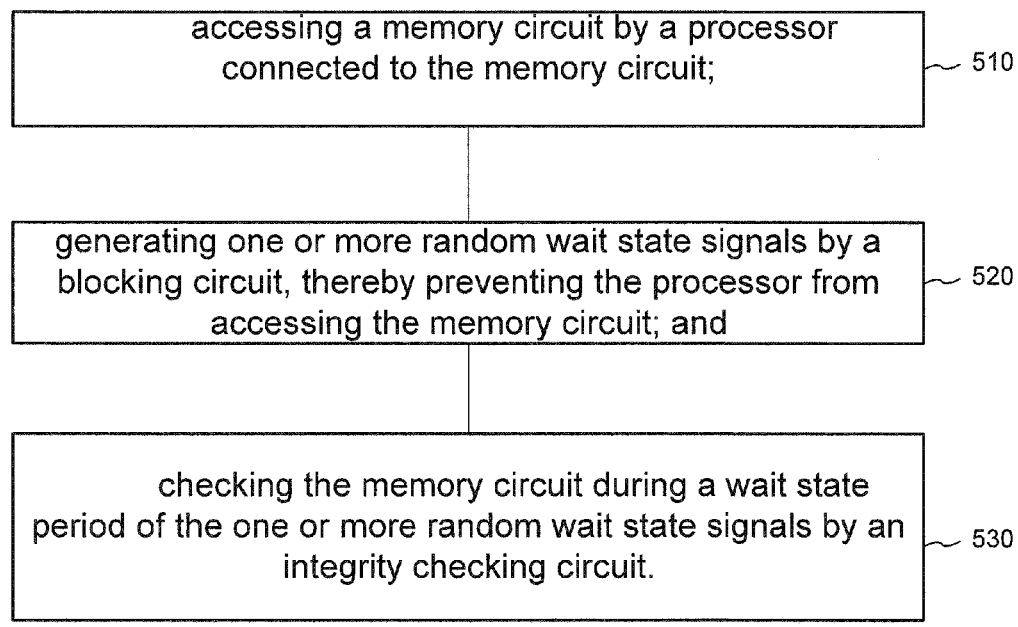
FIG. 5 shows a method for integrity checking according to an embodiment.

FIG. 5 shows method 500 for integrity checking according to an embodiment.

Method 500 includes accessing a memory circuit by a processor connected to the memory circuit (in 510);
generating one or more random wait state signals by a blocking circuit, thereby preventing the processor from accessing the memory circuit (in 520); and
checking the memory circuit during a wait state period of the one or more random wait state signals by an integrity checking circuit (in 530).

Various embodiments provide a circuit arrangement, including a processor; a memory circuit connected to the processor, wherein the processor is configured to access the memory circuit; a blocking circuit configured to generate one or more random wait state signals which prevent the processor from accessing the memory circuit; and an integrity checking circuit configured to check the memory circuit during a wait state period of the one or more random wait state signals.

According to an embodiment, the blocking circuit is configured to generate one or more random wait state signals which triggers the integrity checking circuit to check the memory circuit during a wait state period wherein the processor is prevented from accessing the memory circuit.

According to an embodiment, the processor is configured to perform at least one cryptographic algorithm.

According to an embodiment, the processor is configured to perform at least one cryptographic algorithm from the following group of cryptographic algorithms, the group consisting of: authentication algorithms, ciphering algorithms; and hash-function algorithms.

According to an embodiment, the processor is configured to perform at least one ciphering algorithm from the following group of ciphering algorithms, the group consisting of: symmetric ciphering algorithm; and asymmetric ciphering algorithm.

According to an embodiment, the processor is configured to perform a block-ciphering algorithm.

According to an embodiment, the processor is configured to perform a symmetric block-ciphering algorithm.

According to an embodiment, the processor is configured to perform at least one cryptographic algorithm and to generate an associated signal related to execution properties of the at least one cryptographic algorithm; and the blocking circuit is configured to generate one or more random wait state signals which alters the associated signal.

According to an embodiment, the associated signal includes at least one type of from the following group of types of information, the group consisting of: timing information, power consumption information, electromagnetic radiation information.

According to an embodiment, the blocking circuit is configured to generate one or more randomly generated wait state signals during execution of instructions by the processor, which halt the execution of instructions by the processor.

According to an embodiment, the integrity checking circuit is configured to perform an integrity check on a predetermined set of memory data in the memory circuit.

According to an embodiment, the circuit arrangement further includes a read-only memory circuit configured to store one or more integrity checking instructions.

According to an embodiment, the integrity checking circuit is configured to receive one or more integrity checking instructions including a set of memory data and a location of the memory data to be checked.

According to an embodiment, the integrity checking circuit is configured to perform an integrity check on memory data in the memory circuit during a randomly generated wait state during which the execution of instructions by the processor is halted.

According to an embodiment, the integrity checking circuit is configured to perform an algorithm to determine a state of memory data in the memory circuit.

According to an embodiment, the integrity checking circuit is configured to perform at least one algorithm from the following group of algorithms, the group consisting of: ciphering algorithm; and hash-function algorithm.

According to an embodiment, the integrity checking circuit is configured to perform a block-ciphering algorithm.

According to an embodiment, the integrity checking circuit is configured to perform at least one ciphering algorithm from the following group of ciphering algorithms, the group consisting of: secret key ciphering algorithm; and public key ciphering algorithm.

According to an embodiment, the integrity checking circuit is configured to perform a symmetric block-ciphering algorithm.

According to an embodiment, the integrity checking circuit is configured to determine whether or not the state of memory data in the memory circuit matches the reference state value.

According to an embodiment, the integrity checking circuit is further configured to output a signal indicating that the integrity of the memory data is maintained wherein the state of the memory data in the memory circuit resulting from the integrity check matches a reference state value; and to output a signal indicating that the integrity of the memory data is not maintained wherein the state of the memory data in the memory circuit resulting from the integrity check does not match a reference state value.

According to an embodiment, the processor is configured to access the memory circuit wherein the output signal indicates that the integrity of the memory data is maintained; and wherein the processor is configured to be prevented from access to the memory circuit wherein the output signal indicates that the integrity of the memory data is not maintained.

According to an embodiment, the circuit arrangement further includes a non-volatile memory circuit configured to store at least one of a reference state value and a seed value.

According to an embodiment, the circuit arrangement further includes a controller circuit configured to perform at least one task from the following group of tasks when it is determined by the integrity check circuit that a state of the memory data in the memory circuit does not match a reference state value, the at least one task including at least one from the following group of actions, the group consisting of: halting the processor, removing power from the processor, resetting the memory circuit, stopping a processor clock.

According to an embodiment, the memory circuit includes at least one memory circuit from the following group of memory circuits, the group of memory circuits consisting of: a non-volatile memory, a random access memory, a read only memory, and a flash memory.

According to an embodiment, the memory circuit includes at least one memory circuit from the following group of memory circuits, the group of memory circuits consisting of: a magnetoresistive random access memory, a conductive bridge random access memory, a phase change element random access memory, a programmable read only memory, an erasable programmable read only memory, an electrically erasable programmable read only memory, a static random access memory.

According to an embodiment, the circuit arrangement further includes a direct memory access controller configured to transfer memory data from the memory circuit to the integrity checking circuit.

Various embodiments provide a method for forming a circuit arrangement, the method including: connecting a memory circuit to a processor; configuring the processor to access the memory circuit; configuring a blocking circuit to generate one or more random wait state signals which prevent the processor from accessing the memory circuit; and configuring an integrity checking circuit to check the memory circuit during a wait state period of the one or more random wait state signals.

Various embodiments provide a method for integrity checking, the method including accessing a memory circuit by a processor connected to the memory circuit; generating one or more random wait state signals by a blocking circuit, thereby preventing the processor from accessing the memory circuit; and checking the memory circuit during a wait state period of the one or more random wait state signals by an integrity checking circuit.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
a processor, wherein the processor is configured to perform at least one cryptographic algorithm and to generate an associated signal related to execution properties of the at least one cryptographic algorithm;
a memory circuit connected to the processor, wherein the processor is configured to access the memory circuit;
a blocking circuit configured to generate one or more randomly generated wait state signals which prevent the processor from accessing the memory circuit,
wherein the blocking circuit is configured to generate the one or more randomly generated wait state signals during execution of instructions by the processor, which halt the execution of instructions by the processor and which alters the associated signal; and
an integrity checking circuit configured to access the memory circuit during a wait state period of the one or more random wait state signals,
wherein the integrity checking circuit is configured to perform an integrity check on memory data in the memory circuit during a randomly generated wait state period during which the processor halts execution of instructions.

2. The circuit arrangement according to claim 1, wherein the blocking circuit is configured to generate one or more randomly generated wait state signals which triggers the integrity checking circuit to access the memory circuit during a wait state period wherein the processor is prevented from accessing the memory circuit.

3. The circuit arrangement of claim 2, wherein the one or more randomly generated wait state signals prevent unwanted side-channel attacks.

4. The circuit arrangement according to claim 1, wherein the processor is configured to perform at least one cryptographic algorithm from the following group of cryptographic algorithms, the group consisting of: authentication algorithms, ciphering algorithms; and hash-function algorithms.

5. The circuit arrangement according to claim 1, wherein the processor is configured to perform at least one ciphering algorithm from the following group of ciphering algorithms, the group consisting of: symmetric ciphering algorithm; and asymmetric ciphering algorithm.

6. The circuit arrangement according to claim 5,
wherein the processor is configured to perform a symmetric block-ciphering algorithm.

7. The circuit arrangement according to claim 1, wherein the processor is configured to perform a block-ciphering algorithm.

8. The circuit arrangement according to claim 1, wherein the associated signal comprises at least one type of from the following group of types of information, the group consisting of: timing information, power consumption information, electromagnetic radiation information.

9. The circuit arrangement according to claim 1, wherein the integrity checking circuit is configured to perform an integrity check on a predetermined set of memory data in the memory circuit.

10. The circuit arrangement of claim 9, wherein in response to the integrity checking circuit detecting a change in the memory content, the circuit arrangement is configured to prevent processor access to at least a portion of the memory circuit.

11. The circuit arrangement according to claim 1, further comprising
a read-only memory circuit configured to store one or more integrity checking instructions.

12. The circuit arrangement according to claim 1,
wherein the integrity checking circuit is configured to receive one or more integrity checking instructions comprising a set of memory data and a location of the memory data to be checked.

13. The circuit arrangement according to claim 1,
wherein the integrity checking circuit is configured to perform an algorithm to determine a state of memory data in the memory circuit.

14. The circuit arrangement according to claim 13,
wherein the integrity checking circuit is configured to perform at least one algorithm from the following group of algorithms, the group consisting of: ciphering algorithm; and hash-function algorithm.

15. The circuit arrangement according to claim 14,
wherein the integrity checking circuit is configured to perform a symmetric block-ciphering algorithm.

16. The circuit arrangement according to claim 13,
wherein the integrity checking circuit is configured to perform a block-ciphering algorithm.

17. The circuit arrangement according to claim 13,
wherein the integrity checking circuit is configured to perform at least one ciphering algorithm from the following group of ciphering algorithms, the group consisting of: secret key ciphering algorithm; and public key ciphering algorithm.

18. The circuit arrangement according to claim 13,
wherein the integrity checking circuit is configured to determine whether or not the state of memory data in the memory circuit matches a reference state value.

19. The circuit arrangement according to claim 13,
wherein the integrity checking circuit is further configured to output a signal indicating that the integrity of the memory data is maintained wherein the state of the memory data in the memory circuit resulting from the integrity check matches a reference state value; and to output a signal indicating that the integrity of the memory data is not maintained wherein the state of the memory data in the memory circuit resulting from the integrity check does not match a reference state value.

20. The circuit arrangement according to claim 19,
wherein the processor is configured to access the memory circuit wherein the output signal indicates that the integrity of the memory data is maintained; and
wherein the processor is configured to be prevented from access to the memory circuit wherein the output signal indicates that the integrity of the memory data is not maintained.

21. The circuit arrangement according to claim 1, further comprising
a non-volatile memory circuit configured to store at least one of a reference state value and a seed value.

22. The circuit arrangement according to claim 1, further comprising
a controller circuit configured to perform at least one task from the following group of tasks when it is determined by the integrity check circuit that a state of the memory data in the memory circuit does not match a reference state value,
the at least one task comprising at least one from the following group of actions, the group consisting of: halting the processor, removing power from the processor, resetting the memory circuit, stopping a processor clock.

23. The circuit arrangement according to claim 1,
wherein the memory circuit comprises at least one memory circuit from the following group of memory circuits, the group of memory circuits consisting of: a non-volatile memory, a random access memory, a read only memory, and a flash memory.

24. The circuit arrangement according to claim 1,
wherein the memory circuit comprises at least one memory circuit from the following group of memory circuits, the group of memory circuits consisting of: a magnetoresistive random access memory, a conductive bridge random access memory, a phase change element random access memory, a programmable read only memory, an erasable programmable read only memory, an electrically erasable programmable read only memory, a static random access memory.

25. The circuit arrangement according to claim 1, further comprising
a direct memory access controller configured to transfer memory data from the memory circuit to the integrity checking circuit.

26. A method for forming a circuit arrangement, the method comprising:
connecting a memory circuit to a processor, wherein the processor is configured to perform at least one cryptographic algorithm and to generate an associated signal related to execution properties of the at least one cryptographic algorithm;

configuring the processor to access the memory circuit;

configuring a blocking circuit to generate one or more randomly generated wait state signals which prevent the processor from accessing the memory circuit, wherein the blocking circuit is configured to generate one or more randomly generated wait state signals during execution of instructions by the processor, which halt the execution of instructions by the processor and alters the associated signal related to execution properties of the at least one cryptographic algorithm; and configuring an integrity checking circuit to access the memory circuit during a wait state period of the one or more random wait state signals, wherein the integrity checking circuit is configured to perform an integrity check on memory data in the memory circuit during a randomly generated wait state period during which the processor halts execution of instructions.

27. A method for integrity checking, the method comprising:

accessing a memory circuit by a processor connected to the memory circuit, wherein the processor is configured to perform at least one cryptographic algorithm and to generate an associated signal related to execution properties of the at least one cryptographic algorithm;

generating one or more randomly generated wait state signals by a blocking circuit, thereby preventing the processor from accessing the memory circuit, wherein the blocking circuit is configured to generate one or more randomly generated wait state signals during execution of instructions by the processor, which halt the execution of instructions by the processor and alters the associated signal related to execution properties of the at least one cryptographic algorithm; and accessing the memory circuit during a wait state period of the one or more random wait state signals by an integrity checking circuit, wherein the integrity checking circuit is configured to perform an integrity check on memory data in the memory circuit during a randomly generated wait state period during which the processor halts execution of instructions.

* * * * *